United States Patent
De Weijer et al.

(10) Patent No.: US 8,821,774 B2
(45) Date of Patent: Sep. 2, 2014

(54) METHOD FOR MANUFACTURING HIGH MOLECULAR WEIGHT POLYETHYLENE FIBERS

(75) Inventors: Anton Peter De Weijer, Nijmegen (NL); Martinus Wilhelmus Maria Gemma Peters, Nijmegen (NL); Joris Eem Van Der, Arnhem (NL); Hendrik Van De Hee, Ede (NL)

(73) Assignee: Teijin Aramid B.V., Arnhem (NL)

( * ) Notice: Subject to any disclaimer, the term of this patent is extended or adjusted under 35 U.S.C. 154(b) by 621 days.

(21) Appl. No.: 13/003,361

(22) PCT Filed: Jul. 8, 2009

(86) PCT No.: PCT/EP2009/058641
§ 371 (c)(1),
(2), (4) Date: Jan. 10, 2011

(87) PCT Pub. No.: WO2010/003971
PCT Pub. Date: Jan. 14, 2010

(65) Prior Publication Data
US 2011/0124835 A1    May 26, 2011

(30) Foreign Application Priority Data

Jul. 10, 2008 (EP) .................................. 08160053

(51) Int. Cl.
*B29C 67/04* (2006.01)
*D01F 6/04* (2006.01)
*D01D 5/42* (2006.01)
*B29C 69/00* (2006.01)

(52) U.S. Cl.
CPC .................. *D01D 5/42* (2013.01); *D01D 5/423* (2013.01); *B29C 69/001* (2013.01); *D01F 6/04* (2013.01)
USPC ........... 264/118; 264/119; 264/126; 264/147; 264/280; 264/288.4

(58) Field of Classification Search
USPC .............. 264/118, 119, 126, 147, 280, 288.4, 264/DIG. 47
See application file for complete search history.

(56) References Cited

U.S. PATENT DOCUMENTS

| | | | |
|---|---|---|---|
| 4,344,908 A | 8/1982 | Smith et al. | |
| 4,953,234 A | 9/1990 | Li et al. | |
| 5,004,778 A * | 4/1991 | Waagen et al. ........... | 264/126 X |
| 5,106,555 A | 4/1992 | Kobayashi et al. | |
| 5,106,558 A | 4/1992 | Kobayashi et al. | |
| 5,167,876 A | 12/1992 | Lem et al. | |
| 5,284,411 A | 2/1994 | Enomoto et al. | |
| 5,503,791 A | 4/1996 | Fortuin et al. | |
| 5,578,373 A | 11/1996 | Kobayashi et al. | |
| 5,650,451 A | 7/1997 | Yagi et al. | |
| 5,756,660 A | 5/1998 | Shiraishi et al. | |
| 6,017,480 A | 1/2000 | Yoshida et al. | |
| 6,265,504 B1 | 7/2001 | Liu et al. | |
| 6,794,033 B2 | 9/2004 | Morin et al. | |
| 6,863,976 B2 | 3/2005 | Morin et al. | |
| 6,951,685 B1 | 10/2005 | Weedon et al. | |
| 7,671,159 B2 | 3/2010 | Rastogi et al. | |
| 7,740,779 B2 | 6/2010 | Harding et al. | |
| 7,964,266 B2 | 6/2011 | Harding et al. | |
| 7,976,930 B2 | 7/2011 | Weedon et al. | |
| 7,993,715 B2 | 8/2011 | Geva et al. | |
| 8,197,935 B2 | 6/2012 | Bovenschen et al. | |
| 2001/0053443 A1 | 12/2001 | Perez et al. | |
| 2003/0127768 A1 | 7/2003 | Morin et al. | |
| 2004/0267313 A1 | 12/2004 | Amery et al. | |
| 2005/0091961 A1 * | 5/2005 | Prickett ........................ | 57/238 |
| 2006/0142521 A1 | 6/2006 | Rastogi et al. | |
| 2008/0287990 A1 * | 11/2008 | Smit ............................. | 606/228 |
| 2010/0144224 A1 | 6/2010 | De Weijer et al. | |
| 2011/0124835 A1 | 5/2011 | De Weijer et al. | |
| 2011/0268951 A1 | 11/2011 | Eem Van Der et al. | |
| 2011/0268952 A1 | 11/2011 | Eem Van Der et al. | |

FOREIGN PATENT DOCUMENTS

| | | |
|---|---|---|
| EP | 0 231 547 A1 | 8/1987 |
| EP | 0 269 151 A1 | 6/1988 |
| EP | 0 292 074 A1 | 11/1988 |
| EP | 0 374 785 A1 | 6/1990 |
| EP | 0 874 005 A1 | 10/1998 |
| EP | 0 833 742 B1 | 9/2002 |
| EP | 1 627 719 A1 | 2/2006 |
| EP | 1 746 187 A1 | 1/2007 |
| EP | 2 014 445 A1 | 1/2009 |
| JP | A-6-10254 | 1/1994 |
| JP | A-8-26487 | 1/1996 |
| JP | A-2002-180324 | 6/2002 |

(Continued)

OTHER PUBLICATIONS

Research Disclosure, RD 326076, published on Jun. 10, 1991.*
Mitani et al., "Unprecedented Living Olefin Polymerization Derived from an Attractive Interaction between a Ligand and a Growing Polymer Chain," Chem. Eur. J., vol. 9, pp. 2396-2403, 2003.
Sep. 5, 2008 International Search Report and Written Opinion issued in International Application No. PCT/EP2008/005385.
Mar. 16, 2010 International Search Report and Written Opinion issued in International Application No. PCT/EP2010/050063.
Jul. 2, 2010 International Search Report and Written Opinion issued in International Application No. PCT/EP2010/050065.

(Continued)

*Primary Examiner* — Leo B Tentoni
(74) *Attorney, Agent, or Firm* — Oliff PLC

(57) ABSTRACT

A process for manufacturing high molecular weight polyethylene fibers, including subjecting a polyethylene tape with a weight average molecular weight of at least 500,000 grams/mole, a Mw/Mn ratio of at most 6, and a 200/110 uniplanar orientation parameter of at least 3 to a force in the direction of the thickness of the tape over the entire width of the tape. A polyethylene fiber having a Mw of at least 500 000 gram/mole, a Mw/Mn ratio of at most 6, and a 020 uniplanar orientation value of at most 55°.

13 Claims, No Drawings

(56) References Cited

FOREIGN PATENT DOCUMENTS

| WO | WO 86/05739 A1 | 10/1986 |
|----|----|----|
| WO | WO 91/12136 A1 | 8/1991 |
| WO | WO 97/00766 A1 | 1/1997 |
| WO | WO 01/21668 A1 | 3/2001 |
| WO | WO 2004/113057 A1 | 12/2004 |
| WO | WO 2006/107197 A1 | 10/2006 |
| WO | WO 2009/007045 A1 | 1/2009 |

OTHER PUBLICATIONS

Jun. 19, 2012 Office Action issued in U.S. Appl. No. 12/452,526.
Third Party Submission dated Oct. 5, 2012 from Japanese Patent Application No. 2011-517906.
Feb. 5, 2009 Extended European Search Report issued in Application No. 08160053.8.
Feb. 5, 2013 Office Action issued in U.S. Appl. No. 13/467,729.
Ihara et al., "Single site polymerization of ethylene and 1-olefins initiated by rare earth metal complexes," Macromol. Chem. Phys., vol. 197, pp. 1909-1917, 1996, Hüthig & Wepf Verlag, Zug.
Sep. 29, 2009 International Search Report issued in PCT/EP2009/058992.
Sep. 29, 2009 Written Opinion issued in PCT/EP2009/058992.
U.S. Appl. No. 13/054,618 filed in the name of Soon Joo Bovenschen et al. Jan. 18, 2011.
U.S. Appl. No. 13/467,729 filed in the name of Soon Joo Bovenschen et al. May 9, 2012.
U.S. Appl. No. 13/144,038 filed in the name of Joris Eem Van Der et al. Jul. 11, 2011.
U.S. Appl. No. 13/143,744 filed in the name of Joris Eem Van Der et al. Jul. 8, 2011.
U.S. Appl. No. 12/452,526 filed in the name of Anton Peter De Weijer et al. Jan. 7, 2010.
Office Action issued Oct. 20, 2011 in U.S. Appl. No. 13/054,618.
Wang et al., "Rolling and Roll-Drawing of Ultrahigh Molecular Weight Polyethylene Reactor Powders," Journal of Applied Polymer Science, vol. 43, No. 8, pp. 1559-1564, Oct. 20, 1991.
Van Der Werff et al., "Tensile Deformation of High Strength and High Modulus Polyethylene Fibers," Colloid and Polymer Science, vol. 269, No. 8, pp. 747-763, Aug. 8, 1991.
Rastogi et al., "Heterogeneity in Polymer Melts from Melting of Polymer Crystals," Nature Materials, vol. 4, No. 8, pp. 635-641, Aug. 1, 2005.
Lippits, "Controlling the melting kinetics of polymers; a route to a new melt state," Eindhoven University of Technology, ISBN 978-90-386-0895-2, Mar. 6, 2007.
Written Opinion of the International Search Authority issued in International Application No. PCT/EP2009/058641 on Oct. 5, 2009.
International Search Report issued in corresponding International Application No. PCT/EP2009/058641, mailed Oct. 5, 2009.
U.S. Office Action dated Nov. 7, 2013 from U.S. Appl. No. 13/143,744.

\* cited by examiner

METHOD FOR MANUFACTURING HIGH MOLECULAR WEIGHT POLYETHYLENE FIBERS

TECHNICAL FIELD

The present invention pertains to a method for manufacturing high molecular weight polyethylene fibers. The invention also pertains to high molecular weight polyethylene fibers.

BACKGROUND

High molecular weight polyethylene fibers and processes for their manufacture are known in the art.

U.S. Pat. No. 4,344,908 describes a process for making polymer filaments which have a high tensile strength and a high modulus by stretching a solvent-containing polymer filament at a temperature between the swelling point and the melting point of the polymer.

EP 231 547 describes a process for manufacturing high strength high modulus polyethylene objects by polymerising ethylene in a hydrocarbon solvent in the presence of a catalyst system to form a solution of linear polyethylene with a molecular weight of $4*10^5$ to $5*10^6$ gram/mole, converting the solution to a solvent-containing object such as a fiber, cooling the object to form a gel, and subjecting the object to a stretching step.

US 2004/0267313 describes a method in which a gel-spun ultra-high molecular weight polyethylene is subjected to a processing step to remove solvent before or after the fiber is woven with other fibers.

A disadvantage of the methods described above is that they all involve the use of solvent in the manufacture of the polymer. Accordingly, the thus obtained fibers always contain a certain amount of residual solvent, which may detrimentally affect the properties of the fiber. Further, the recovery of solvent is highly uneconomical.

Solvent-free methods for manufacturing fibers from high molecular weight polyethylene have also been described.

JP6010254 describes a method of manufacturing a high strength non-woven fabric composed of an ultrahigh molecular weight polyethylene. A film of the ultra-high molecular weight polyethylene is subjected to a slitting step, and the slit film is stretched with a stretch ratio of at least 2 in at least the longitudinal direction to provide stretched tape. The stretched tape is cooled to a temperature below 80° C., and then opened at an opening ratio of 0.5-4 (roll peripheral speed/tape speed), to provide split yarn. The split yarn is then formed into webs, which are joined to form the non-woven material. The slitting process applied in this reference has a number of disadvantages. To name a few, there is a minimum width for the strips obtained by the splitting, the splitting step may detrimentally affect polymer properties, and the slitting step is an extra processing step and desirably avoided for that reason also. It is known in the art that low-linear density fibers add more comfort, flexibility, and elongation to products like ropes and fabrics. The relatively wide slitted tape as mentioned does not provide such an advantage.

U.S. Pat. No. 5,578,373 describes a method for manufacturing a split polyethylene stretched material by subjecting an ultra-high molecular weight polyethylene to stretching and then subjecting the stretched polyethylene to splitting. While methods like tapping, twisting, rubbing, brushing, the use of an air yet, and the use of ultrasonic waves and bomb blasts are mentioned, mechanical splitting methods which use splitters of various types are preferred.

US2003/0127768 describes a process for the manufacture of a shaped part of ultra-high molecular weight polyethylene via melt-processing wherein ultra-high molecular weight polyethylene is annealed at a temperature between 130 and 136° C. for at least one hour, converted into a shaped part at a temperature above 142° C., and then cooled down to a temperature below 135° C. To form a fiber, the annealed material can be spun through a spinneret to form filaments, which are subsequently stretched at a temperature between the melting point of the filament and a temperature not more than 10° C. below the melting point. Again, this process has a number of disadvantages. The process of this reference comprises an annealing step which is desirably avoided. Further, the spinning of ultra-high molecular weight polymer melts requires detailed process control, int. al. as a result of the high viscosity of molten ultra-high molecular weight polyethylene, and is therefore not easy to operate in commercial practice.

SUMMARY

Accordingly, there is need in the art for a process for manufacturing solvent-free fibers from high molecular weight polyethylene, which process is easy to operate in commercial practice and provides high-quality fibers, in particular low-linear density fibers. The present invention provides such a process. The present invention also provides high molecular weight polyethylene fibers with good properties.

The present invention is therefore directed to a process for manufacturing high molecular weight polyethylene fibers, comprising subjecting a polyethylene tape with a weight average molecular weight of at least 500 000 gram/mole, an Mw/Mn ratio of at most 6, and a 200/110 uniplanar orientation parameter of at least 3 to a force in the direction of the thickness of the tape over the whole width of the tape.

DETAILED DESCRIPTION OF THE EMBODIMENTS

It has been found that a polyethylene tape with a weight average molecular weight of at least 500 000 gram/mole, an Mw/Mn ratio of at most 6, and a 200/110 uniplanar orientation parameter of at least 3 can be converted into fibres by the mere act of subjecting the stretched material to a force in a direction perpendicular to the thickness of the tape over the whole width of the tape. It is not necessary to apply a slitting step as has been done conventionally in the art.

It is noted that the low molecular weight distribution and the minimum value for the 200/110 uniplanar orientation parameter are essential to the process according to the invention. It has been found that where either of these requirements are not met, it will be not possible, or at least very difficult to carry out the process according to the invention. Further the attractive low-linear density fibers will not be obtained. The molecular weight of at least 500 000 gram/mole is advantageous to obtain attractive tensile properties.

It is noted that high molecular weight polyethylene with an Mw/Mn ratio of at most 6 is known in the art, for example from WO2004/113057. This reference mentions that the material can be used to manufacture shaped parts such as filaments, films, or moulded or extruded articles. They are particularly described for use in medical applications such as elements of a hip or knee prosthesis. Manufacturing of filaments is not described.

EP292074 describes filaments from high molecular weight low Mw/Mn ratio polyethylene obtained by the steps of compacting the polyethylene with a process auxiliary agent at a temperature which is preferably less than 30° C. below the dissolution temperature of the mixture of polymer and process auxiliary. The material may then be processed by passing it through a heated opening followed by stretching. This reference does not describe the particular method according to the invention, and also does not describe the specific fibers that may be obtained therewith.

EP374785 describes a process for the continuous production of a high-strength and high-modulus polyolefin material by subjecting a high molecular weight polyolefin powder to a compression step below the melting point of the polymer, followed by rolling and stretching the resultant compression-moulded polyolefin.

Wang and Porter (Journal of Applied Polymer Science 43, 1991, pp. 1559-1564) describes rolling-drawing of ultra-high molecular weight polyethylene.

H. van der Werf and A. J. Pennings, Colloid Polymer Sci 269:747-763 (1991) describes fibers of polyethylene with a molecular weight of $5.5 \cdot 10^6$ kg/mol and a Mw/Mn ratio of 3, which are obtained by gel-spinning. It has been found that gel-spun fibers do not show a 020 uniplanar orientation parameter of at most 55°.

The tape used in the process according to the invention will generally be a tape of indeterminate length. The width of the tape is not critical to the process according to the invention. Suitable tape widths are between 0.5 mm and 30 cm. In one embodiment the tape width may be between 0.5 mm and 20 mm, in particular between 0.5 mm and 10 mm, more in particular between 0.5 mm and 5 mm.

The thickness of the tape is not particularly limited. It will generally range between 1 micron and 100 micron. As the force required to divide the tape into individual fibres will decrease with the thickness of the tape, it may be preferred for the tape to have a thickness of at most 50 microns, more preferably at most 25 microns, still more preferably at most 10 microns.

The ratio between the width of the tape and the thickness of the tape generally is at least 10:1, in particular at least 50:1.

In this document ultra high molecular weight polyethylene will also be indicated as UHMWPE.

The weight average molecular weight (Mw) of the UHMWPE used in the present invention, and of the fibers according to the invention, is at least 500 000 gram/mole, in particular between $1 \cdot 10^6$ gram/mole and $1 \cdot 10^8$ gram/mole. The molecular weight distribution and molecular weigh averages (Mw, Mn, Mz) of the polymer are determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. The system is calibrated using sixteen polystyrene standards (Mw/Mn<1.1) in the molecular weight range $5 \cdot 10^3$ to $8 \cdot 10^6$ gram/mole.

The molecular weight distribution may also be determined using melt rheometry. Prior to measurement, a polyethylene sample to which 0.5 wt % of an antioxidant such as IRGANOX 1010 has been added to prevent thermo-oxidative degradation, would first be sintered at 50° C. and 200 bars. Disks of 8 mm diameter and thickness 1 mm obtained from the sintered polyethylenes are heated fast (~30° C./min) to well above the equilibrium melting temperature in the rheometer under nitrogen atmosphere. For an example, the disk was kept at 180 C for two hours or more. The slippage between the sample and rheometer discs may be checked with the help of an oscilloscope. During dynamic experiments two output signals from the rheometer i.e. one signal corresponding to sinusoidal strain, and the other signal to the resulting stress response, are monitored continuously by an oscilloscope. A perfect sinusoidal stress response, which can be achieved at low values of strain was an indicative of no slippage between the sample and discs.

Rheometry may be carried out using a plate-plate rheometer such as Rheometrics RMS 800 from TA Instruments. The Orchestrator Software provided by the TA Instruments, which makes use of the Mead algorithm, may be used to determine molar mass and molar mass distribution from the modulus vs frequency data determined for the polymer melt. The data is obtained under isothermal conditions between 160-220° C. To get the good fit angular frequency region between 0.001 to 100 rad/s and constant strain in the linear viscoelastic region between 0.5 to 2% should be chosen. The time-temperature superposition is applied at a reference temperature of 190° C. To determine the modulus below 0.001 frequency (rad/s) stress relaxation experiments may be performed. In the stress relaxation experiments, a single transient deformation (step strain) to the polymer melt at fixed temperature is applied and maintained on the sample and the time dependent decay of stress is recorded.

The UHMWPE used in the invention can be a homopolymer of ethylene or a copolymer of ethylene with a co-monomer which is another alpha-olefin or a cyclic olefin both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of (non-ethylene) alpha-olefin in the ethylene homopolymer or copolymer used in the process according to the invention preferably is at most 10 mole %, preferably at most 5 mole %, more preferably at most 1 mole %. If a (non-ethylene) alpha-olefin is used, it is generally present in an amount of at least 0.001 mol. %, in particular at least 0.01 mole %, still more in particular at least 0.1 mole %. Obviously, the ranges given above for the starting material also apply to the final polymer fibers.

The molecular weight distribution of the UHMWPE used in the present invention, and of the fibers according to the invention, is relatively narrow. This is expressed by the Mw (weight average molecular weight) over Mn (number average molecular weight) ratio of at most 6. More in particular the Mw/Mn ratio is at most 5, still more in particular at most 4, even more in particular at most 3. The use of materials with an Mw/Mn ratio of at most 2.5, or even at most 2 is envisaged in particular. It has been found that if the tapes do not have the required Mw/Mn ratio, the tape will not split into individual fibers, but only divide into a limited number of segments.

The tape used as starting material in the present invention has a 200/110 uniplanar orientation parameter Φ of at least 3. The 200/110 uniplanar orientation parameter Φ is defined as the ratio between the 200 and the 110 peak areas in the X-ray diffraction (XRD) pattern of the tape sample as determined in reflection geometry.

Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e. intensity as function of the diffraction angle 2θ (this is the angle between the diffracted beam and the primary beam).

The 200/110 uniplanar orientation parameter gives information about the extent of orientation of the 200 and 110 crystal planes with respect to the tape surface. For a tape sample with a high 200/110 uniplanar orientation the 200 crystal planes are highly oriented parallel to the tape surface.

The ratio between the 200 and 110 peak areas for a specimen with randomly oriented crystallites is around 0.4.

The value for the 200/110 uniplanar orientation parameter may be determined using an X-ray diffractometer. A Bruker-AXS D8 diffractometer equipped with focusing multilayer X-ray optics (Göbel mirror) producing Cu—Kα radiation (K wavelength=1.5418 Å) is suitable. Measuring conditions: 2 mm anti-scatter slit, 0.2 mm detector slit and generator setting 40 kV, 35 mA. The tape specimen is mounted on a sample holder, e.g. with some double-sided mounting tape. The preferred dimensions of the tape sample are 15 mm×15 mm (l×w). Care should be taken that the sample is kept perfectly flat and aligned to the sample holder. The sample holder with the tape specimen is subsequently placed into the D8 diffractometer in reflection geometry (with the normal of the tape perpendicular to the goniometer and perpendicular to the sample holder). The scan range for the diffraction pattern is from 5° to 40° (2θ) with a step size of 0.02° (2θ) and a counting time of 2 seconds per step. During the measurement the sample holder spins with 15 revolutions per minute around the normal of the tape, so that no further sample alignment is necessary. Subsequently the intensity is measured as function of the diffraction angle 2θ. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The 200/110 uniplanar orientation parameter is defined as the ratio between the 200 and 110 peak areas. This parameter is a quantitative measure of the 200/110 uniplanar orientation.

As indicated above, the tape used as starting material in the present invention has a 200/110 uniplanar orientation parameter of at least 3. It may be preferred for this value to be at least 4, more in particular at least 5, or at least 7. Higher values, such as values of at least 10 or even at least 15 may be particularly preferred. The theoretical maximum value for this parameter is infinite if the peak area 110 equals zero.

In the process according to the invention a tape with the required values for the molecular weight, Mw/Mn ratio and 200/110 uniplanar orientation parameter is subjected to a force in the direction of the thickness of the tape over the whole width of the tape. This can be done in a number of ways. For example, the tape may be contacted with an air stream in the direction of the thickness of the tape. For another example, the tape is led over a roll which applies a force onto the tape in the direction of the tape. In a further embodiment, the force is applied by twisting the tape in the longitudinal direction, therewith applying a force in the direction perpendicular to the direction of the tape. In another embodiment, the force is applied by peeling filaments from the tape. In a further embodiment, the tape is contacted with an air tangier or other texturizing device like a crimper, false twister, or air texturizing device. For an example, a Parallel Plate-jet from Heberlein (type PP1600) may be used. These jets have been developed for interlacing technical yarns. They may be adapted to tailor them for use in the present invention. For example, a number of air jets can be applied in parallel, or an air slit can be used. It is also possible to use jets or slits ejecting other media, such as water.

The force required to convert the tape into fibres does not have to be very strong. While the use of strong forces is not detrimental to the product, it is not required from an operation point of view. Accordingly, in one embodiment, the force applied is lower than 10 bar.

The minimum force required will depend on the properties of the tape, in particular on its thickness and on the value for the 200/110 uniplanar orientation parameter.

The thinner the tape, the lower the force is that will be required to divide the tape into individual fibres. The higher the value for the 200/110 uniplanar orientation parameter, the more the polymers in the tape are oriented in parallel, and the lower the force is that will be required to divide the tape into individual fibres. It is within the scope of the skilled person to determine the lowest possible force. In general, the force is at least 0.1 bar.

Upon application of the force upon the tape as described above, the material divides itself into individual fibers.

The dimensions of the individual fibers are generally as follows.

The width of the fibers is generally between 1 micron and 500 micron, in particular between 1 micron and 200 micron, more in particular between 5 micron and 50 micron.

The thickness of the fibers is generally between 1 micron and 100 micron, in particular between 1 micron and 50 micron, more in particular between 1 micron and 25 micron.

The ratio between the width and the thickness is generally between 10:1 and 1:1, more in particular between 5:1 and 1:1, still more in particular between 3:1 and 1:1.

The present invention allows the manufacture of fibres which have a lower linear density than fibers which can be obtained via conventional processes such as splitting. Thus, in one embodiment, the fibers have an average linear density of at most 50 dtex, more in particular at most 35 dtex. The average linear density is defined as the linear density of the starting tape divided by the number of fibers resulting from the starting tape. The linear density of the starting tape is calculated from the weight of one meter of tape. The number of fibers resulting from the starting tape is determined by counting the number of fibers formed along a line perpendicular to the edge of the starting tape. The counting can for example be performed by spreading the fibers obtained from a tape in the crosswise direction as evenly as possible, fixing the spread fibers onto an adhesive tape, drawing a line on the tape in the direction perpendicular to the tape direction, and counting the number of fibers crossing the line.

Upon application of a force onto the tape, the tape is thus converted into a number of individual fibers. The number of fibers into which the tape is divided depends mainly on the width of the stretched material. Generally, the tape will be divided into at least 10 fibers, more in particular into at least 20 fibers, still more in particular at least 35 fibers. For tapes with a width of at least 4 cm, more than 50 fibers may be obtained, or even more than 100. Again, the number of fibers is determined by counting the number of fibers formed along a line perpendicular to the length of the starting tape.

The thus-obtained bundle of fibres can be divided up into smaller bundles, or smaller bundles can be combined to form thicker bundles. It may be preferred to further process the fiber bundles resulting from a single tape as such, and not further divide them or combine them. It is noted that the result of the process according to the invention does not have to be a bundle of endless fibers. It may be that the fibers are in the form of a network-like construction.

The fibres and fibre bundles of the present invention can be further processed according to processes known in the art. For example, they can be provided with a finish, they can be twisted, braided, knitted, or woven.

The present invention also pertains to new polyethylene fibers with specified properties. These fibers may be obtained through the process of the present invention.

The fibers according to the invention are ultra-high molecular weight polyethylene fibers having an Mw of at least 500 000 gram/mole, an Mw/Mn ratio of at most 6, and a 020 uniplanar orientation parameter of at most 55°.

For further elucidation and preferred ranges on the nature of the PE, the Mw, and the Mw/Mn ratio reference is made to what has been stated above for the starting material.

The fibers according to the invention are characterised by a 020 uniplanar orientation parameter of at most 55°. The 020 uniplanar orientation parameter gives information about the extent of orientation of the 020 crystal planes with respect to the fiber surface.

The 020 uniplanar orientation parameter is measured as follows. The sample is placed in the goniometer of the diffractometer with the machine direction perpendicular to the primary X-ray beam. Subsequently the intensity (i.e. the peak area) of the 020 reflection is measured as function of the goniometer rotation angle Φ. This amounts to a rotation of the sample around its long axis (which coincides with the machine direction) of the sample. This results in the orientation distribution of the crystal planes with indices 020 with respect to the filament surface. The 020 uniplanar orientation parameter is defined as the Full Width at Half Maximum (FWHM) of the orientation distribution.

The measurement can be carried out using a Bruker P4 with HiStar 2D detector, which is a position-sensitive gas-filled multi-wire detector system. This diffractometer is equipped with graphite monochromator producing Cu—Kα radiation (K wavelength=1.5418 Å). Measuring conditions: 0.5 mm pinhole collimator, sample-detector distance 77 mm, generator setting 40 kV, 40 mA and at least 100 seconds counting time per image.

The fiber specimen is placed in the goniometer of the diffractometer with its machine direction perpendicular to the primary X-ray beam (transmission geometry). Subsequently the intensity (i.e. the peak area) of the 020 reflection is measured as function of the goniometer rotation angle Φ. The 2D diffraction patterns are measured with a step size of 1° (Φ) and counting time of at least 300 seconds per step.

The measured 2D diffraction patterns are corrected for spatial distortion, detector non-uniformity and air scattering using the standard software of the apparatus. It is within the scope of the skilled person to effect these corrections. Each 2-dimensional diffraction pattern is integrated into a 1-dimensional diffraction pattern, a so-called radial 2θ curve. The peak area of the 020 reflections is determined by a standard profile fitting routine, with is well within the scope of the skilled person. The 020 uniplanar orientation parameter is the FWHM in degrees of the orientation distribution as determined by the peak area of the 020 reflection as function of the rotation angle Φ of the sample.

As indicated above, the fibres according to the invention have a 020 uniplanar orientation parameter of at most 55°. The 020 uniplanar orientation parameter preferably is at most 45°, more preferably at most 30°. In some embodiments the 020 uniplanar orientation value may be at most 25°. It has been found that fibres which have a 020 uniplanar orientation parameter within the stipulated range have a high strength and a high elongation at break.

Like the 200/110 uniplanar orientation parameter, the 020 uniplanar orientation parameter is a measure for the orientation of the polymers in the fiber. The use of two parameters derives from the fact that the 200/110 uniplanar orientation parameter cannot be used for fibers because it is not possible position a fiber sample adequately in the apparatus. The 200/110 uniplanar orientation parameter is suitable for application onto bodies with a width of 0.5 mm or more. On the other hand, the 020 uniplanar orientation parameter is in principle suitable for materials of all widths, thus both for fibers and for tapes. However, this method is less practical in operation than the 200/110 method. Therefore, in the present specification the 020 uniplanar orientation parameter will be used only for fibers with a width smaller than 0.5 mm. However, the tape used as starting material in the process according to the invention will have values for the 020 uniplanar orientation parameter which are in principle inherently the same as those given above for the fibers according to the invention.

As indicated above, the fibers according to the invention have a high tensile strength and a high energy to break.

In one embodiment of the present invention, the fibers have a tensile strength of at least 2.0 GPa, determined in accordance with ASTM D882-00. Tensile strengths may be obtained of at least 2.5 GPA, in particular at least 3.0 GPa, more in particular at least 3.5 GPa. Tensile strengths of at least 4.0 GPa may also be obtained.

In one embodiment of the present invention, the fibers have a tensile energy to break of at least 30 J/g. The tensile energy to break is determined in accordance with ASTM D882-00 using a strain rate of 50%/min. It is calculated by integrating the energy per unit mass under the stress-strain curve. In one embodiment, fibers according to the invention have a tensile energy to break of at least 35 J/g, in particular at least 40 J/g, more in particular at least 50 J/g.

The tensile energy to break may be approximated by the following methods. These will give a fair approximation of the tensile energy to break as it is to be determined in accordance with ASTM D882-00 as discussed above.

An approximation of the tensile energy to break may be obtained by integrating the total energy absorbed and dividing it by the mass of the original gage region of the specimen. In particular, since the stress-strain curve of UHMWPE samples with a tenacity over 2.0 GPa is approximately a straight line, the tensile energy to break can be calculated by the following formula $$TEB = \frac{\sigma}{\rho} * \frac{EAB}{2} * 10$$

in which sigma is the tensile strength in GPa according to ASTM D882-00, rho is density in g/cm³, EAB is the elongation at break, expressed as a percentage according to ASTM D882-00, and TEB is the tensile energy to break in J/g.

Another approximation of the tensile energy to break TEB can be derived from tensile modulus and tensile strength in accordance with the following formula;

$$TEB = \frac{\sigma^2}{2 * \text{Modulus} * \rho} * 10^3$$

The modulus of the UHMWPE fibers according to the invention is generally at least 80 GPa. The modulus is determined in accordance with ASTM D822-00. Depending on the stretching ratio, moduli may be obtained of at least 100 GPa, more in particular at least 120 GPa. It is possible to obtain moduli of at least 140 GPa, or at least 150 GPa.

The fibres and bundles of fibres of the present invention can be used in numerous applications, including ballistic applications, ropes, cables, nets, fabrics, and protective applications. Ballistic attributes, ropes, cables, nets, fabrics, and protective appliances derived from the fibers of the invention are also part of the present invention.

As discussed above, in the process according to the invention the starting material is a polyethylene tape with a weight average molecular weight of at least 500 000 gram/mole, an Mw/Mn ratio of at most 6, and a 200/110 uniplanar orientation parameter of at least 3. Tapes meeting these specifications can be obtained by a process comprising the steps of subjecting a starting UHMWPE with a weight average molecular weight of at least 500 000 gram/mole, an elastic shear modulus determined directly after melting at 160° C. of at most 1.4 MPa, and an Mw/Mn ratio of at most 6 to a compacting step and a stretching step under such conditions that at no point during the processing of the polymer its temperature is raised to a value above its melting point, wherein the total stretching ratio applied is at least 120.

It has been found that the combination of a starting UHMWPE with a weight average molecular weight of at least 500 000 gram/mole, an elastic shear modulus determined directly after melting at 160° C. of at most 1.4 MPa, and an Mw/Mn ratio of at most 6, in combination with solid state processing and a total stretching ratio of at least 120 allows the manufacture of tapes with a 200/110 uniplanar orientation parameter of at least 3. Higher values for the 200/110 uniplanar orientation parameter can be obtained with lower elastic shear moduli for the same molecular weight, lower Mw/Mn ratio's, and higher stretching ratios.

In one embodiment, the present invention thus pertains to a process for manufacturing high molecular weight polyethylene fibers comprising the steps of subjecting a starting UHMWPE with a weight average molecular weight of at least 500 000 gram/mole, an elastic shear modulus determined directly after melting at 160° C. of at most 1.4 MPa, and an Mw/Mn ratio of at most 6 to a compacting step and a stretching step under such conditions that at no point during the processing of the polymer its temperature is raised to a value above its melting point, wherein the total stretching ratio applied is at least 120, so as to form a polyethylene tape with a weight average molecular weight of at least 500 000 gram/mole, an Mw/Mn ratio of at most 6, and a 200/110 uniplanar orientation parameter of at least 3, and subjecting the tape to a force in the direction of the thickness of the tape over the whole width of the tape.

As indicated above, the starting UHMWPE has an elastic shear modulus $G_N^0$ determined directly after melting at 160° C. of at most 1.4 Mpa, in particular at most 0.9 MPa, more in particular at most 0.8 MPa, still more in particular at most 0.7 MPa. The wording "directly after melting" means that the elastic shear modulus is determined as soon as the polymer has melted, in particular within 15 seconds after the polymer has melted. For this polymer melt $G_N^0$ typically increases from 0.6 to 2.0 MPa in one, two, or more hours, depending on the molar mass. The elastic shear modulus directly after melting at 160° C. is one of the characterising features of the very disentangled UHMWPE used in the present invention.

$G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, rho is the density in $g/cm^3$, R is the gas constant and T is the absolute temperature in K.

A low elastic shear modulus thus stands for long stretches of polymer between entanglements, and thus for a low degree of entanglement. The adopted method for the investigation on changes in $G_N^0$ with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4 (8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2).

The UHMWPE used in the present invention preferably has a DSC crystallinity of at least 74%, more in particular at least 80%. The morphology of the tapes may be characterised using differential scanning calorimetry (DSC), for example on a Perkin Elmer DSC7. Thus, a sample of known weight (2 mg) is heated from 30 to 180° C. at 10° C. per minute, held at 180° C. for 5 minutes, then cooled at 10° C. per minute. The results of the DSC scan may be plotted as a graph of heat flow (mW or mJ/s; y-axis) against temperature (x-axis). The crystallinity is measured using the data from the heating portion of the scan. An enthalpy of fusion ΔH (in J/g) for the crystalline melt transition is calculated by determining the area under the graph from the temperature determined just below the start of the main melt transition (endotherm) to the temperature just above the point where fusion is observed to be completed. The calculated ΔH is then compared to the theoretical enthalpy of fusion ($ΔH_c$ of 293 J/g) determined for 100% crystalline PE at a melt temperature of approximately 140° C. A DSC crystallinity index is expressed as the percentage $100(ΔH/ΔH_c)$.

The tape used as starting material in the process according to the invention and the fibers according to the invention preferably also have crystallinities as indicated above.

The starting polymer for use in the present invention may be manufactured by a polymerisation process wherein ethylene, optionally in the presence of other monomers as discussed above, is polymerised in the presence of a single-site polymerisation catalyst at a temperature below the crystallisation temperature of the polymer, so that the polymer crystallises immediately upon formation. In particular, reaction conditions are selected such that the polymerisation speed is lower than the crystallisation speed. These synthesis conditions force the molecular chains to crystallize immediately upon their formation, leading to a rather unique morphology which differs substantially from the one obtained from the solution or the melt. The crystalline morphology created at the surface of a catalyst will highly depend on the ratio between the crystallization rate and the growth rate of the polymer. Moreover, the temperature of the synthesis, which is in this particular case also crystallization temperature, will strongly influence the morphology of the obtained UHMWPE powder. In one embodiment the reaction temperature is between −50 and +50° C., more in particular between −15 and +30° C. It is well within the scope of the skilled person to determine via routine trial and error which reaction temperature is appropriate in combination with which type of catalyst, polymer concentrations and other parameters influencing the reaction.

To obtain a highly disentangled UHMWPE it is important that the polymerisation sites are sufficiently far removed from each other to prevent entangling of the polymer chains during synthesis. This can be done using a single-site catalyst which is dispersed homogenously through the crystallisation medium in low concentrations. More in particular, concentrations less than 1.10-4 mol catalyst per liter, in particular less than 1.10-5 mol catalyst per liter reaction medium may be appropriate. Supported single site catalyst may also be used, as long as care is taken that the active sites are sufficiently far removed from each other to prevent substantial entanglement of the polymers during formation.

Suitable methods for manufacturing starting UHMWPE used in the present invention are known in the art. Reference is made, for example to WO01/21668 and US20060142521.

The polymer is provided in particulate form, for example in the form of a powder, or in any other suitable particulate form. Suitable particles have a particle size of up to 5000 micron, preferably up to 2000 micron, more in particular up to 1000 micron. The particles preferably have a particle size of at least 1 micron, more in particular at least 10 micron.

The particle size distribution may be determined by laser diffraction (PSD, Sympatec Quixel) as follows. The sample is dispersed into surfactant-containing water and treated ultrasonic for 30 seconds to remove agglomerates/entanglements. The sample is pumped through a laser beam and the scattered light is detected. The amount of light diffraction is a measure for the particle size.

The UHMWPE powder used as starting material may have a relatively low bulk density. More in particular, the material may have a bulk density below 0.25 g/cm$^3$, in particular below 0.18 g/cm$^3$, still more in particular below 0.13 g/cm$^3$. The bulk density may be determined in accordance with ASTM-D1895. A fair approximation of this value can be obtained as follows. A sample of UHMWPE powder is poured into a measuring beaker of exact 100 ml. After scraping away the surplus of material, the weight of the content of the beaker is determined and the bulk density is calculated.

The compacting step is carried out to integrate the polymer particles into a single object, e.g., in the form of a mother sheet. The stretching step is carried out to provide orientation to the polymer and manufacture the final product. The two steps are carried out at a direction perpendicular to each other. It is noted that it is within the scope of the present invention to combine these elements in a single step, or to carry out the process in different steps, each step performing one or more of the compacting and stretching elements. For example, in one embodiment of the process according to the invention, the process comprises the steps of compacting the polymer powder to form a mothersheet, rolling the plate to form rolled mothersheet and subjecting the rolled mothersheet to a stretching step to form a polymer tape.

The compacting force applied in the process according to the invention generally is 10-10000 N/cm$^2$, in particular 50-5000 N/cm$^2$, more in particular 100-2000 N/cm$^2$. The density of the material after compacting is generally between 0.8 and 1 kg/dm$^3$, in particular between 0.9 and 1 kg/dm$^3$.

In the process according to the invention the compacting and rolling step is generally carried out at a temperature of at least 1° C. below the unconstrained melting point of the polymer, in particular at least 3° C. below the unconstrained melting point of the polymer, still more in particular at least 5° C. below the unconstrained melting point of the polymer. Generally, the compacting step is carried out at a temperature of at most 40° C. below the unconstrained melting point of the polymer, in particular at most 30° C. below the unconstrained melting point of the polymer, more in particular at most 10° C.

The initial melting point of the polymer is highly dependent on the length of the molecular chain. It is of particular importance that the molecular weight distribution is narrow so as to prevent melting of any low-molecular weight component. Such partial melting results in isotropic coiling of the molecular chain. This will result in the tape not dividing into fibers upon the application of a force in the direction of the thickness of the tape over the whole width of the tape, or only dividing into a limited number of fibers.

In the process according to the invention the stretching step is generally carried out at a temperature of at least 1° C. below the melting point of the polymer under process conditions, in particular at least 3° C. below the melting point of the polymer under process conditions, still more in particular at least 5° C. below the melting point of the polymer under process conditions. As the skilled person is aware, the melting point of polymers may depend upon the constraint under which they are put. This means that the melting temperature under process conditions may vary from case to case. It can easily be determined as the temperature at which the stress tension in the process drops sharply. Generally, the stretching step is carried out at a temperature of at most 30° C. below the melting point of the polymer under process conditions, in particular at most 20° C. below the melting point of the polymer under process conditions, more in particular at most 15° C.

In one embodiment of the present invention, the stretching step encompasses at least two individual stretching steps, wherein the first stretching step is carried out at a lower temperature than the second, and optionally further, stretching steps. In one embodiment, the stretching step encompasses at least two individual stretching steps wherein each further stretching step is carried out at a temperature which is higher than the temperature of the preceding stretching step.

As will be evident to the skilled person, this method can be carried out in such a manner that individual steps may be identified, e.g., in the form of the films being fed over individual hot plates of a specified temperature. The method can also be carried out in a continuous manner, wherein the film is subjected to a lower temperature in the beginning of the stretching process and to a higher temperature at the end of the stretching process, with a temperature gradient being applied in between. This embodiment can for example be carried out by leading the film over a hot plate which is equipped with temperature zones, wherein the zone at the end of the hot plate nearest to the compaction apparatus has a lower temperature than the zone at the end of the hot plate furthest from the compaction apparatus.

In one embodiment, the difference between the lowest temperature applied during the stretching step and the highest temperature applied during the stretching step is at least 3° C., in particular at least 7° C., more in particular at least 10° C. In general, the difference between the lowest temperature applied during the stretching step and the highest temperature applied during the stretching step is at most 30° C., in particular at most 25° C.

The unconstrained melting temperature of the starting polymer is between 138 and 142° C. and can easily be determined by the person skilled in the art. With the values indicated above this allows calculation of the appropriate operating temperature. The unconstrained melting point may be determined via DSC (differential scanning calorimetry) in nitrogen, over a temperature range of +30 to +180° C. and with an increasing temperature rate of 10° C./minute. The maximum of the largest endothermic peak at from 80 to 170° C. is evaluated here as the melting point.

It has also been found that, as compared to conventional processing of UHMWPE, materials with a strength of at least 2 GPa can be manufactured at higher deformation speeds. The deformation speed is directly related to the production capacity of the equipment. For economical reasons it is important to produce at a deformation rate which is as high as possible without detrimentally affecting the mechanical properties of the film. In particular, it has been found that it is possible to manufacture a material with a strength of at least 2 GPa by a process wherein the stretching step that is required to increase the strength of the product from 1.5 GPa to at least 2 GPa is carried out at a rate of at least 4% per second. In conventional polyethylene processing it is not possible to carry out this stretching step at this rate. While in conventional UHMWPE processing the initial stretching steps, to a strength of, say, 1 or 1.5 GPa may be carried out at a rate of above 4% per second, the final steps, required to increase the strength of the film to a value of 2 GPa or higher, must be carried out at a rate well below 4% per second, as otherwise the film will break. In contrast, in the process according to the invention it has been found that it is possible to stretch intermediate film with a strength of 1.5 GPa at a rate of at least 4% per second, to obtain a material with a strength of at least 2 GPa. For further preferred values of the strength reference is made to what has been stated above. It has been found that the rate applied in this step may be at least 5% per second, at least 7% per second, at least 10% per second, or even at least 15% per second.

The strength of the film is related to the stretching ratio applied. Therefore, this effect can also be expressed as follows. In one embodiment of the invention, the stretching step of the process according to the invention can be carried out in such a manner that the stretching step from a stretching ratio of 80 to a stretching ratio of at least 100, in particular at least 120, more in particular at least 140, still more in particular of at least 160 is carried out at the stretching rate indicated above.

In still a further embodiment, the stretching step of the process according to the invention can be carried out in such a manner that the stretching step from a material with a modulus of 60 GPa to a material with a modulus of at least at least 80 GPa, in particular at least 100 GPa, more in particular at least 120 GPa, at least 140 GPa, or at least 150 GPa is carried out at the rate indicated above.

In will be evident to the skilled person that the intermediate products with a strength of 1.5 GPa, a stretching ratio of 80, and/or a modulus of 60 GPa are used, respectively, as starting point for the calculation of when the high-rate stretching step starts. This does not mean that a separately identifiable stretching step is carried out where the starting material has the specified value for strength, stretching ratio, or modulus. A product with these properties may be formed as intermediate product during a stretching step. The stretching ratio will then be calculated back to a product with the specified starting properties. It is noted that the high stretching rate described above is dependent upon the requirement that all stretching steps, including the high-rate stretching step or steps are carried out at a temperature below the melting point of the polymer under process conditions.

Conventional apparatus may be used to carry out the compacting step, rolling, and stretching steps. Suitable apparatus include heated rolls, endless belts, etc.

The stretching step in the process according to the invention is carried out to manufacture the polymer tape. The stretching step may be carried out in one or more steps in a manner conventional in the art. A suitable manner includes leading the tape in one or more steps over a set of rolls both rolling in process direction wherein the second roll rolls faster that the first roll. Stretching can take place over a hot plate or in an air circulation oven. In general it is difficult to control the temperature of this type of equipment within 1 degree, which will allow the skilled person to appreciate the broadened operating window provided by the process of the present invention.

As indicated above, in the process according to the invention, the total stretching ratio applied is at least 120. The application of this high stretching ratio, in combination with the selection of the polymer and the other manufacturing conditions, makes it possible to convert the stretched object to fibers by the mere step of subjecting the stretched material to a force perpendicular to the stretching direction.

In particular, the total stretching ratio applied is at least 140, more in particular at least 160. It has been found that very good results are obtained when the total stretching ratio is at least 180, or even at least 200. The total stretching ratio is defined as the area of the cross-section of the compacted mothersheet divided by the cross-section of the drawn tape produced from this mothersheet.

The process according to the invention is carried out in the solid state. The polymer tape has a polymer solvent content of less than 0.05 wt. %, in particular less than 0.025 wt. %, more in particular less than 100 ppm (0.01 wt. %). The same values are applicable to the fibers according to the invention.

The invention is illustrated by the following examples, without being limited thereto or thereby.

EXAMPLE AND COMPARATIVE EXAMPLES

Various tapes were subjected to a tangling step using an EnkaTechnicaJet-PP1600 air interlacing device operated at 6 bar pressure. The tension was around 0.5 g/dtex with a line speed of 12 m/min. Tensile testing was done after subjecting the obtained fibers to twisting of 100 times/m.

Table 1 summarises the properties of tapes meeting the requirements of the present invention (200/110 orientation parameter, Mw/Mn ratio, Mw, tenacity, tape thickness, and linear density) and the properties of the fibers manufactured using the process according to the invention from this tape (020 orientation parameter, tenacity, number of filaments, and average filament linear density).

TABLE 1

| | according to the invention | | | | | | | | | |
|---|---|---|---|---|---|---|---|---|---|---|
| | 200/110 | Mw/Mn | Mw | Tenacity GPa | LD dtex | Thickness Micron | 020 | Tenacity GPa | #filaments | FLD dtex |
| | | | | Tape | | | | Fiber from tape | | |
| 1 | 16.5 | 3.2 | $2.7 * 10^6$ | 3.4 | 1151 | 15 | <55° | 2.7 | 73 | 16 |
| 2 | 8.8 | 3.2 | $2.7 * 10^6$ | 2.8 | 1287 | 30 | <55° | 2.1 | 47 | 27 |

Table 2 summarises the corresponding properties of tapes not meeting the requirements of the present invention (200/110 orientation parameter, Mw/Mn ratio, Mw, tenacity, tape thickness, and linear density) and the properties of the fibers manufactured using the same process.

TABLE 2

| | 200/110 | Mw/Mn | Mw | Tenacity GPa Tape | LD dtex | Thickness Micron | 020 | Tenacity GPa Fiber from tape | #filaments | FLD dtex |
|---|---|---|---|---|---|---|---|---|---|---|
| | | | | comparative | | | | | | |
| 1 | 1.7 | 8.34 | 3.6 * 10^6 | 1.8 | 3565 | 51 | <55° | 1.4 | 3 | 1188 |
| 2 | 5.7 | 9.79 | 4.3 * 10^6 | 2.1 | 3459 | 49 | <55° | 1.6 | 12 | 288 |
| 3 | 6 | 9.79 | 4.3 * 10^6 | 2.3 | 3074 | 28 | <55° | 1.6 | 32 | 96 |

As can be seen from a comparison of the two tables, when the starting tape does not have a Mw/Mn ratio in the claimed range, the tape will not split into fibers, but will merely divide into individual sections. The 200/110 orientation parameter also has an influence. The higher the 200/110 orientation parameter, the higher the number of fibers formed from an individual tape, but it is the combination of the two parameters which leads to the attractive effect of the present invention to obtain low linear density fibers with high strength.

The invention claimed is:

1. A process for manufacturing high molecular weight polyethylene fibers, comprising:
    forming a polyethylene tape with a weight average molecular weight of at least 500,000 grams/mole, a Mw/Mn ratio of at most 6, and a 200/110 uniplanar orientation parameter of at least 3 by subjecting a starting polyethylene to a stretching step in which a total stretching ratio applied is at least 80, and
    subjecting the polyethylene tape to a force in a direction of a thickness of the tape over an entire width of the tape.

2. The process according to claim 1 comprising:
    subjecting a starting UHMWPE with a weight average molecular weight of at least 500,000 grams/mole, an elastic shear modulus determined directly after melting at 160° C. of at most 1.4 MPa, and a Mw/Mn ratio of at most 6 to a compacting step and a stretching step under such conditions that at no point during the processing of the polymer is a temperature of the polymer raised to a value above a melting point of the polymer, wherein a total stretching ratio applied is at least 120, so as to form a polyethylene tape with a weight average molecular weight of at least 500,000 grams/mole, a Mw/Mn ratio of at most 6, and a 200/110 uniplanar orientation parameter of at least 3, and
    subjecting the tape to a force in the direction of the thickness of the tape over the entire width of the tape.

3. The process of claim 2 wherein the starting UHMWPE has an elastic shear modulus determined directly after melting at 160° C. of at most 0.9 MPa.

4. The process of claim 2 wherein the total stretching ratio is at least 140.

5. The process of claim 1 wherein the tape is subjected to a force in the direction of the thickness of the tape over the whole width of the tape by contacting the tape with a stream of air or other ejected medium in the direction of the thickness of the tape, or by leading the tape over a roll applying a force in the direction of the thickness of the tape.

6. The process of claim 5 wherein the force applied on the tape is lower than 10 bar.

7. The process of claim 1 wherein the fibers obtained from the tape have an average linear density of at most 50 dtex.

8. The process of claim 1 wherein the fibers are obtained in the absence of a separate slitting step.

9. The process of claim 1 wherein the process yields fibers having a width of from 5 μm to 50 μm and a thickness of from 1 μm to 25 μm.

10. The process of claim 1 wherein the process yields fibers having an average linear density of at most 50 dtex.

11. The process of claim 1 wherein the process yields fibers having a tensile strength of at least 2.0 GPa and a tensile energy to break of at least 30 J/g.

12. The process of claim 1 wherein the total stretching ratio is at least 120.

13. The process of claim 1 wherein the total stretching ratio is at least 160.

* * * * *